F. A. G. PIRWITZ.
VIEW FINDER FOR PHOTOGRAPHIC CAMERAS.
APPLICATION FILED JUNE 26, 1918.
1,285,364.
Patented Nov. 19, 1918.
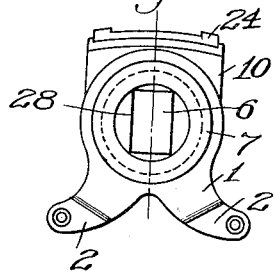
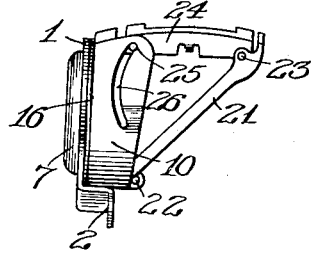
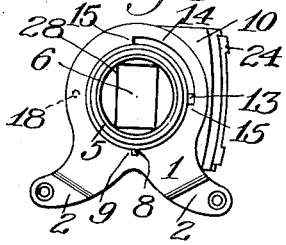
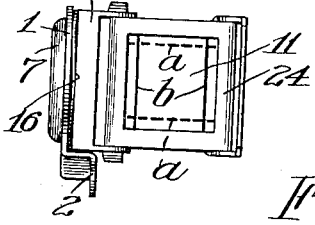
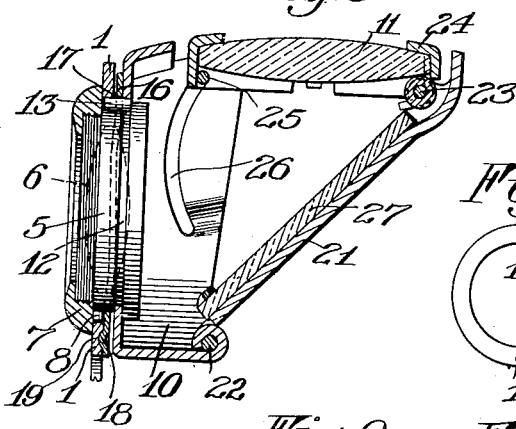
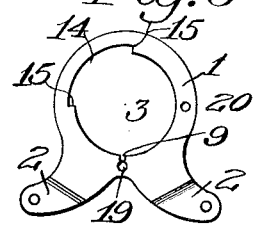
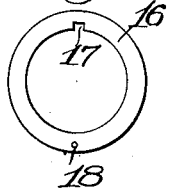
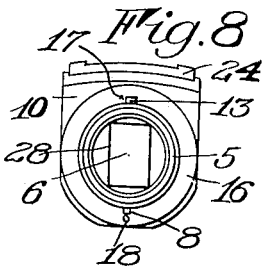
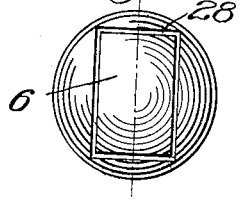
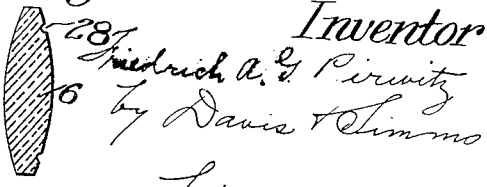
Inventor
Friedrich A. G. Pirwitz
by Davis & Simms
His Attorneys

UNITED STATES PATENT OFFICE.

FRIEDRICH A. GUSTAV PIRWITZ, OF ROCHESTER, NEW YORK.

VIEW-FINDER FOR PHOTOGRAPHIC CAMERAS.

1,285,364.   Specification of Letters Patent.   Patented Nov. 19, 1918.

Application filed June 26, 1918.   Serial No. 242,083.

*To all whom it may concern:*

Be it known that I, FRIEDRICH A. GUSTAV PIRWITZ, a citizen of the United States, and resident of Rochester, in the county of Monroe and State of New York, have invented certain new and useful Improvements in View-Finders for Photographic Cameras, of which the following is a specification.

The present invention relates to view finders for photographic cameras and more particularly to the type which employs a finder lens and a screen with provision whereby the finder may be adjusted to different positions for different positions of the camera.

In view finders of this type it is customary to employ a field defining means which will show the extent of the field to be exposed on the sensitized material by the camera lens, this field being in most cameras elongated in one direction. Heretofore the field defining means has been associated with the screen of the view finder and as a consequence has been movable, or, if stationary, has not exactly defined the field, due to the fact that an irregular opening has been required which will be adapted to both fields. It is a purpose of this invention to associate the field defining means with the finder lens so that the field defining means remains stationary with the lens and, when the screen is shifted relatively to the finder lens, the image of the field defining means will shift on the screen to correspond with the position of the screen. Preferably this field defining means is in the form of a frame, the sides of which lie within the edges of the finder lens so that those portions of the lens beyond the field may be utilized for concentrating rays on the screen from the object viewed.

To these and other ends, the invention consists of certain parts and combinations of parts all of which will be hereinafter described, the novel features being pointed out in the appended claims.

In the drawings:—

Figure 1 is a front view of a view finder constructed in accordance with this invention;

Fig. 2 is a side view;

Fig. 3 is a view similar to Fig. 1, showing the screen shifted;

Fig. 4 is a view similar to Fig. 2, showing the screen shifted;

Fig. 5 is an enlarged, axial section through the view finder;

Fig. 6 is a detail view of the finder support;

Fig. 7 is a detail view of the spring which maintains the finder screen in its shifted positions;

Fig. 8 is a detail view showing the finder support removed;

Fig. 9 is a detail face view of the finder lens; and

Fig. 10 is an axial section through the finder lens.

Referring more particularly to the drawings, 1 indicates the finder support which is secured by the legs 2 to any suitable part of the camera. This support has an opening 3 in which is received the lens mount 5 of the finder lens 6, the lens mount being held to the support 1 by a clamping ring 7 and a pin 8 formed on the lens mount and projecting into the recess 9 on the support, so that the finder lens and its mounting is held fixed or stationary. The member 10 of the support for the image screen 11 turns in a groove 12 in the lens mount and carries a projection 13 which operates in a recess 14 in the support 1 between the shoulders 15 forming the ends of the recess 14, and defining the two positions of the image screen. A spring ring 16 is interposed between the casing member 10 and the support 1 and is interlocked with the casing member 10 through the projectile 13 entering the notch 17 in the ring. A boss 18 on the ring is adapted to enter either one of the depressions 19 and 20 on the support 1 for the purpose of resiliently locking the casing member 10 in its two positions. To the member 10 a member 21 is pivoted at 22, and this member 21 has pivoted to it at 23 the frame 24 of the image screen 11, said frame 24 also having pins 25 which operate in curved slots 26 formed in the member 10 so as to permit the folding of the screen into substantially parallel relation with the finder lens 6. A mirror 27 secured to the member 21 establishes optical relation between the finder lens 6 and the image screen 11 when the parts are in the position shown in Fig. 5. According to the foregoing construction, when the finder is to be used for taking pictures with the camera in a vertical position, the image screen 11 is arranged in the manner shown in Fig. 2, while, in using the finder for taking a horizontally elongated picture, the image screen 11 is shifted to the position shown in Figs. 3 and 4, this shifting being effected without changing the position of the finder lens 6.

The field defining means hereinbefore mentioned is provided in the illustrated embodiment by etching or grooving one face, preferably the rear face, of the finder lens 6, as at 28, with a frame or oblong. This frame is spaced from the edges of the lens and does not interfere with the transmission of light through the spaces between the outside of the frame and the edges of the lens, thus permitting a clear image of the object viewed to be projected upon the image screen 11. When the image screen 11 is in the position shown in Figs 1 and 2, the field defining device will be visible on the screen in the manner shown in dotted lines at $a$ in Fig. 4, thus pointing out a vertically elongated field which will correspond to the field of exposure on the sensitized material. When the view finder is adjusted to the position shown in Figs. 3 and 4, the field defining device will be visible on the screen 11 in the manner shown at $b$ in full lines in Fig. 4, thus defining a horizontally elongated field which will be exposed on the sensitized material when the camera is adjusted for a horizontally elongated picture.

From the foregoing it will be seen that there has been provided a field defining means which is associated with the finder lens and remains stationary with the said lens when the finder screen is turned with reference to the lens, thus eliminating all movable parts in the field defining device. Owing to the fact that the field defining device is in the form of a frame spaced from the edges of the finder lens, those portions of the finder lens outside of the frame act to throw rays from the image on the finder screen and in this way a clearly defined image is obtained.

What I claim as my invention and desire to secure by Letters Patent is:—

1. A view finder for a camera comprising a finder lens, a screen rotatable about the axis of the lens for assuming different positions with different positions of the camera, and a field defining device associated with the finder lens and maintaining a fixed relation with the finder lens when the screen is turned.

2. A view finder according to claim 1 in which the field defining device comprises a frame lying within the edges of the finder lens and maintaining the lens uncovered between the outside of the frame and the edges of the lens.

3. A view finder according to claim 1 in which the field defining device comprises a frame marked on the lens and maintaining the lens uncovered between the outside of the frame and the edges of the lens.

FRIEDRICH A. GUSTAV PIEWITZ.